(12) United States Patent
Kneifel et al.

(10) Patent No.: US 7,276,880 B2
(45) Date of Patent: Oct. 2, 2007

(54) DEVICES AND/OR METHODS FOR DETERMINING THE AVAILABILITY OF ELECTRIC ENERGY, IN PARTICULARLY IN VEHICLE ELECTRIC SYSTEMS COMPRISING SEVERAL ENERGY ACCUMULATORS

(75) Inventors: Markus Kneifel, Schwieberdingen (DE); Sigmar Braeuninger, Weinheim (DE); Christof Gross, Weinstadt (DE)

(73) Assignees: Robert Bosch GmbH, Stuttgart (DE); DaimlerChrysler AG, Stuttgart (DE); VB Autobatterie GmbH, Hannover (DE)

( * ) Notice: Subject to any disclaimer, the term of this patent is extended or adjusted under 35 U.S.C. 154(b) by 290 days.

(21) Appl. No.: 10/482,183

(22) PCT Filed: Jun. 28, 2002

(86) PCT No.: PCT/DE02/02359

§ 371 (c)(1),
(2), (4) Date: Jun. 4, 2004

(87) PCT Pub. No.: WO03/004315

PCT Pub. Date: Jan. 16, 2003

(65) Prior Publication Data

US 2004/0212351 A1 Oct. 28, 2004

(30) Foreign Application Priority Data

Jun. 29, 2001 (DE) ............................... 101 31 268

(51) Int. Cl.
*H01M 10/44* (2006.01)
*H01M 10/46* (2006.01)

(52) U.S. Cl. ..................................... 320/132

(58) Field of Classification Search ................ 320/103, 320/104, 116, 132, 149
See application file for complete search history.

(56) References Cited

U.S. PATENT DOCUMENTS

| 5,710,506 A | 1/1998 | Parvereshi |
| 5,773,962 A | 6/1998 | Nor |
| 5,973,497 A | 10/1999 | Cimbal |
| 6,057,666 A * | 5/2000 | Dougherty et al. ......... 320/104 |
| 6,144,185 A | 11/2000 | Iverson |

FOREIGN PATENT DOCUMENTS

| DE | 196 45 944 A1 | 5/1998 |
| FR | 2 769 764 A | 4/1999 |
| WO | 98 40951 A | 9/1998 |
| WO | 99 22434 A | 5/1999 |

* cited by examiner

*Primary Examiner*—Edward H Tso
(74) *Attorney, Agent, or Firm*—Michael J. Striker

(57) ABSTRACT

The invention relates to devices and/or methods for determining the availability of electrical energy in two-energy accumulator vehicle electric systems, in which both energy accumulators, particularly batteries, can be connected to one another via a D.C. converter. The required electric energy is generated by means of a generator that is driven by a vehicle engine. The customary consumers are connected to a first consumer battery circuit (10, 24). Additional consumer, for example, high-current consumers, particularly the starter, are connected to the second battery circuit (11, 29). A control device, for example, a controller that is equipped with a microprocessor determines the availability of the electric energy and occurring faults while evaluating.

19 Claims, 1 Drawing Sheet

US 7,276,880 B2

Figure 1:
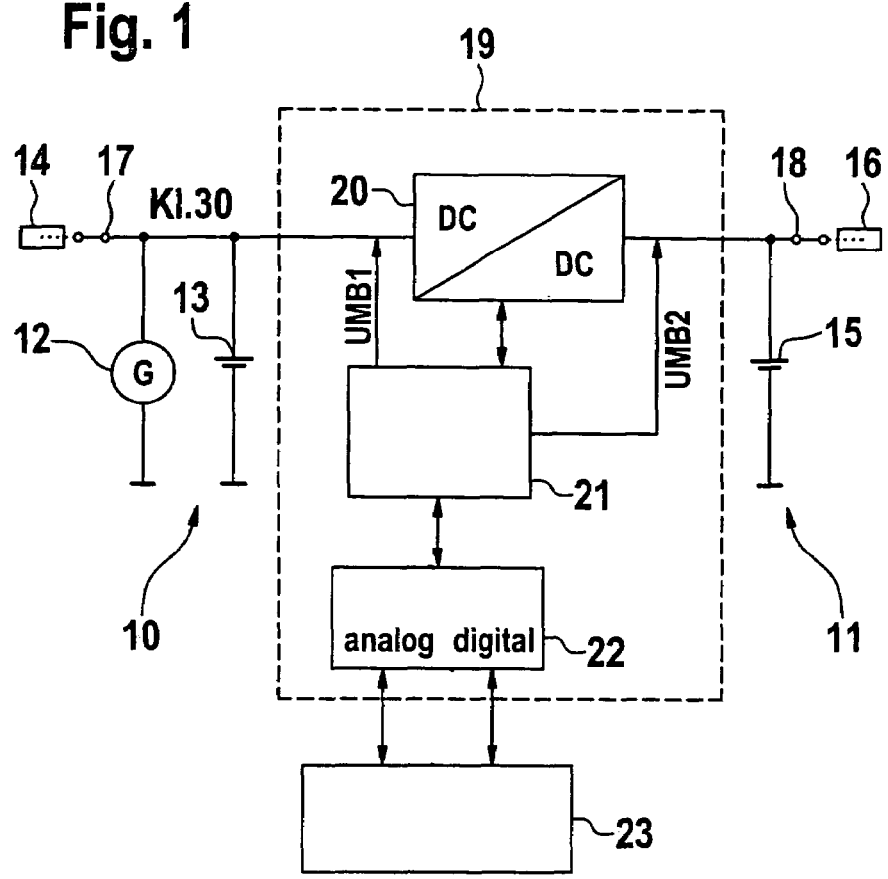

DEVICES AND/OR METHODS FOR DETERMINING THE AVAILABILITY OF ELECTRIC ENERGY, IN PARTICULARLY IN VEHICLE ELECTRIC SYSTEMS COMPRISING SEVERAL ENERGY ACCUMULATORS

CROSS-REFERENCE

The invention described and claimed hereinbelow is also described in PCT/DE 02/02359, filed on Jun. 28, 2002 and DE 101 31 268.7, filed Jun. 29, 2001. This German Patent Application, whose subject matter is incorporated here by reference, provides the basis for a claim of priority of invention under 35U.S.C. 119 (a)-(d).

BACKGROUND OF THE INVENTION

The invention relates to devices and methods for determining the availability of electrical energy, in particular in on-board electrical systems, on the basis of with a plurality of energy-storing means, in particular two of them, in motor vehicles.

Two-battery on-board electrical systems, or on-board electrical systems with two energy-storing means, are known for instance from German Patent DE-P 196 45 944. They typically serve to optimize the electrical energy supply in motor vehicles and have as their primary characteristic a second battery or energy-storing circuit, which depending on the operating state has an electrical coupling or decoupling with or from the main battery circuit. The main battery circuit, which is also called the consumer battery circuit, includes the usual consumer battery, the generator, and most of the electrical consumers. The connection between the first battery circuit (main battery circuit) and the second battery circuit is made via switch elements, which are triggered for instance by a control unit, in particular the so-called on-board electrical system control unit. The switch elements may also be components of the control unit.

The second battery circuit serves to supply consumers that primarily require the electrical supply for only a brief time. Such brief consumers are for instance high-current consumers, such as the starter or an electrically heatable d. Electrical supply to consumers for a length of time Td, in particular for high-current consumers, or reinforcing supply to the first battery circuit.

For the chronological distribution of the modes of operation over the total service life of the vehicle, the following relationship can be assumed:

$$Ta + Tb \gg Tc > Td.$$

In known systems, the availability of stored energy in batteries is determined by means of complicated state of health/state of charge (SOH/SOC) algorithms and by means of a complicated system of current, voltage and temperature sensors. This can be achieved with an accuracy of only approximately ±5% to 10%. A disadvantage of the known method, besides the expenditure for the sensors and the requisite placement of these sensors in the immediate vicinity of the battery, is that monitoring the energy flow path between the battery and the consumer subsystem is generally additionally necessary, which requires increased availability of electrical energy.

SUMMARY OF THE INVENTION

The devices and/or methods according to the invention for determining the availability of electrical energy, in particular in on-board electrical systems that include at least two energy-storing means or least two batteries have the advantage that very reliable determination and signalling as well as display of the still-available electrical energy are possible. This is advantageously attained on the basis of methods on the system level. An especially advantageous feature is that by means of a defined disposition, using existing system state variables, primarily voltage values in the battery circuits, and by using the charge characteristic of the direct-voltage converter and by using state of charge of systems/state of health of systems (SOCS/SOHS) algorithms, evaluations are performed which make statements on the availability of electrical energy in the second battery circuit possible. The attainment of predeterminable threshold value events is evaluated. Thus, a deterministic monitoring of the second battery circuit for predefined threshold value events at the system level is performed. Also advantageously, predefined threshold value events for the first battery circuit, that is, the consumer battery circuit, are signalled by the occurrence of certain system states, which as a causal consequent state require a reinforcing electrical supply for the consumer battery circuit by coupling to the second battery circuit; the trigger signals that effect the switchover are output by the on-board electrical system control unit, or an electronic device responsible for doing so. catalytic converter. By drawing the electrical energy for these consumers from the second battery circuit, no additional load is put on the battery or the main battery circuit.

The possibility furthermore exists of using the electrical energy of the second battery for a brief length of time ranging from a few seconds to several minutes for reinforcing supply to the first battery circuit. The requisite switchover events are performed as needed by the on-board electrical system control unit, which outputs the requisite switchover signals.

With the known two-battery on-board electrical system, a design is possible such that the second battery is loaded by only a very low resting current, and this resting current is caused by leakage currents from consumers and switch elements or from the control unit for decoupling from the first battery circuit or for self-charging of the battery during the decoupled mode of operation in the period when the vehicle is in operation or is at a stop. This load is typically less by a factor of 10 to 50 than the load on the battery in the consumer battery circuit.

In such known two-battery on-board electrical systems, it is usual to optimize the two batteries in terms of their application-specific properties. The battery of the second battery circuit is adapted to the expected requirements and can briefly furnish a high current. For example, the battery in the second circuit is optimized for high-current capacity, since it is used predominantly for supplying the starter, and the starter requires a high current. Instead of a battery as the second energy-storing means, a capacitor can be used, such as a supercap or similar energy-storing element.

The battery of the first battery circuit, that is, the consumer battery circuit, which acts as a supply battery for the usual on-board electrical system consumers, is typically optimized for cycle capacity.

To optimize the charge state of the two batteries, and in particular to optimize the charge state of the battery in the second battery circuit and thus to increase the availability of electrical energy in the entire one, a control unit is also used in the version known from DE-P 196 45 944. This control unit can also have an integrated DC/DC converter for voltage adaptation. The DC/DC converter assures the optimal recharging of the second battery with a charge voltage that is adapted as a function of the battery temperature. Accordingly, in the normal case, the second battery has a high charge state (state of charge (SOC) >90% . . . 95%). This kind of system design furnishes marked advantages at the level of the vehicle. For instance, the certainty of starting and thus the vehicle availability are assured. High electrical availability for the on-board electrical system or (high-current) consumers is also assured.

In the two-battery on-board electrical systems known for instance from DE-OS 196 45 944, at present conventional direct-voltage converters (DC/DC converters) are used. This leads to the following problems: The charge characteristic of the direct-voltage converters (DC/DC converters) used is subdivided into two ranges, dictated by the limited converter power, which is typically 100 to 500 Watts:

1. Constant-current or constant-power regulation: When the maximum converter power is reached, with toleration of a set-point voltage deviation, a limitation of the charge current or charge power is effected. This state occurs when the second battery has a low charge state, for instance after the vehicle has been standing for a very long time, or if there is a defect in the second battery circuit, such as a battery defect, a short circuit in the wiring, or a short circuit in the consumers. If the battery circuit is functional, then as a function of the temperature of the second battery and the value of the constant charge current, no later than after a defined length of time there will be no further set-point voltage deviation. If the defined length of time is exceeded, for instance if a chronological threshold value in the constant-current regulation is reached, this is an indication of a malfunction at the system level, and according to the invention this is used as the new sensor state variable.

2. Voltage regulation: The regulation of the charge voltage is effected to a predetermined set-point value without set-point voltage deviation; in a functional battery circuit, the charge current is adjusted freely in the range from zero to maximum charge current of the direct-voltage converter. This regulation is called voltage regulation.

The two kinds of regulation described above are in principle known in conjunction with the operation of currently used direct-voltage converters (DC/DC converters).

As batteries, conventional lead-acid batteries currently used in motor vehicles are employed. These batteries have a direct correlation between the resting voltage level and the charge state. The charge state is typically ascertained from the resting voltage; a linear range from approximately 11.7 V to 12.9 V between the discharged and the charged battery can be employed. In an on-board electrical system with two batteries or two energy-storing means, undershooting of defined lower voltage threshold values for the second battery circuit (mode of operation: battery in state of repose) is an unambiguous indication of a malfunction at the system level. If a deviation from the normal situation is detected, that is, a deviation from the high charge state of the second battery, this indicates a malfunction.

The modes of operation of the second battery circuit or the second energy-storing circuit, or for the second battery, can be subdivided in accordance with the above remarks into four ranges:

a. The battery is in the state of repose, decoupled from the main battery circuit, for a length of time Ta; that is, it is loaded by only a very low resting current during the operation of the motor vehicle. In this case, the engine is running and thus the generator is also running and furnishes the electrical power required for supplying the consumers in the main battery circuit.

b. The battery is in the state of repose for a length of time Tb; that is, it is loaded by only a very low resting current during the time when the motor vehicle is stopped and during the prestarting phase of the engine. In this state, the engine and generator are not running.

c. Time-limited charging of the battery in the second battery circuit for a length of time Tc; this is generally done with the goal of always maintaining the high charge state of the second battery, by means of a direct-voltage converter connected upstream of the second battery.

The devices and/or methods according to the invention for determining the availability of electrical energy, in particular in on-board electrical systems that include at least two energy-storing means or least two batteries have the advantage that very reliable determination and signalling as well as display of the still-available electrical energy are possible. This is advantageously attained on the basis of methods on the system level. An especially advantageous feature is that by means of a defined disposition, using existing system state variables, primarily voltage values in the battery circuits, and by using the charge characteristic of the direct-voltage converter and by using state of charge of systems/state of health of systems (SOCS/SOHS) algorithms, evaluations are performed which make statements on the availability of electrical energy in the second battery circuit possible. The attainment of predeterminable threshold value events is evaluated. Thus, a deterministic monitoring of the second battery circuit for predefined threshold value events at the system level is performed. Also advantageously, predefined threshold value events for the first battery circuit, that is, the consumer battery circuit, are signalled by the occurrence of certain system states, which as a causal consequent state require a reinforcing electrical supply for the consumer battery circuit by coupling to the second battery circuit; the trigger signals that effect the switchover are output by the on-board electrical system control unit, or an electronic device responsible for doing so.

Another advantage over the prior art is that for two-battery on-board electrical systems, or on-board electrical systems with a plurality of energy-storing means, in particular two, because of the use of the devices and arrangements according to the invention and by using the SOCS/SOHS algorithms, defined statements on the availability of electrical energy can be made. The use and propagation of for instance mechanotronic vehicle systems, a prerequisite of which is high availability of electrical energy and signalling of deviations from the set-point state, is possible for the first time by means of the use of the methods and devices of the invention. Examples of such mechanotronic vehicle systems are the following: electrohydraulic brakes or steering and braking systems with electrical or electrical-mechanical components, systems for electromechanical power steering, comfort transmission, electrical functions/systems in the drive train, electrically heated catalytic converters (e-cats). Direct information on the state of the on-board electrical system, particularly about the availability of electrical energy in the second battery, can be output on an ongoing basis and both indicated to other vehicle systems and displayed to the driver.

The battery in the second battery circuit, because of the direct-voltage converter, in the normal case always has a high charge state. This is reinforced by a charging strategy that assures preferential charging of the second battery.

The use of the voltage sensor system, which is present anyway in the direct-voltage converter, for the SOCS/SOHS algorithms is possible without further expense. No additional current sensor system is needed.

The expansion of the existing function sequence with threshold value indicators and limit values and the use of the existing charging strategy is made possible at minimal expense.

The SOCS/SOHS threshold value events, as a predefined sequence of deviations from the normal case, is defined at the system level; this makes a combined monitoring of the energy source and energy flow path possible at the system level in the second battery circuit.

The use of the typical charging characteristic, taking into account a maximum length of time, dependent on the battery temperature, of constant-current regulation is employed for SOHS monitoring of battery systems.

The choice of the threshold values is made such that in general a predictive signalling of a signal state with markedly reduced availability of electrical energy is possible, which brings about a combined, intertwined use of existing system functions and threshold value indicators.

All vehicle modes of operation are taken into account, making advantageous regulation possible. The signalling is done with the control unit active, generally after the conclusion of initialization of the control unit, for instance by means of a CAN interface.

The simple implementability of the SOCS/SOHS algorithms in function sequence controllers in two-battery on-board electrical systems is made possible.

DRAWING

Figure 2:
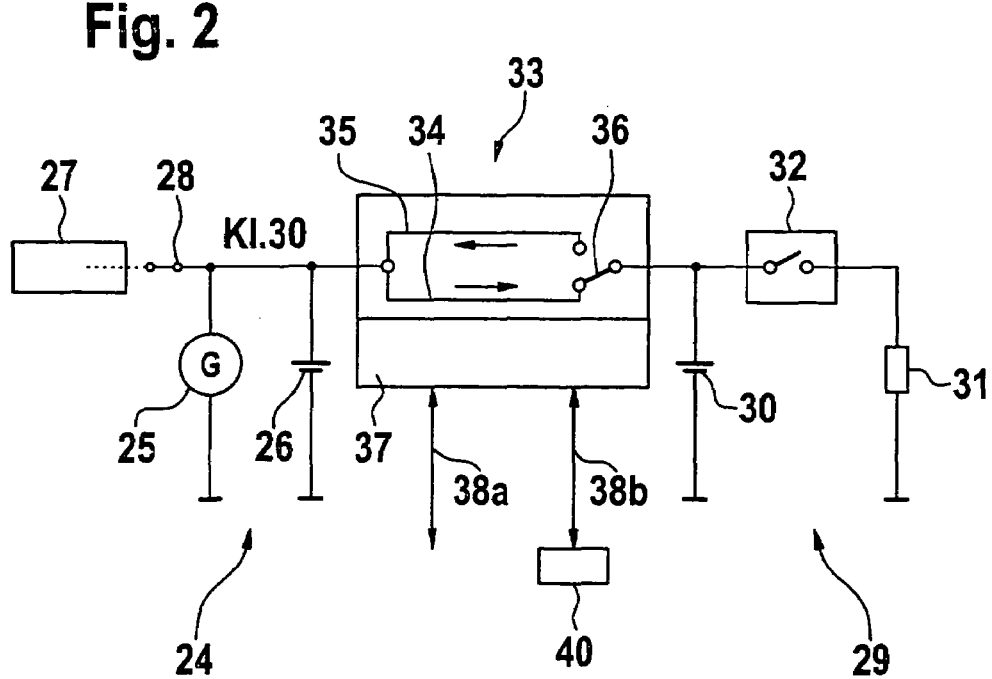

Exemplary embodiments of the invention are shown in FIGS. 1 and 2 of the drawing and described in further detail in the ensuing description.

In FIG. 1, an arrangement for determining the availability of electrical energy in a two-battery on-board electrical system is shown; it includes a first battery circuit 10, which represents the consumer battery circuit, and a second battery circuit 11 for the high-current consumers. Of the first battery circuit 10, the generator 12 and a battery 13, for instance a battery with a rated voltage of 12 V, are shown. The generator 12 and the battery 13 are connected to one another in the usual way via the terminal Kl.30. Also connected to the terminal Kl.30 are the usual electrical consumers 14.

Of the second battery circuit 11, only the battery 15 and a high-current consumer 16 are shown; a high-current consumer of this kind is for instance the starter, an electrically heatable catalytic converter, and so forth. 16a represents a reinforcing supply, by way of which, under given circumstances, electrical power from the battery 15 reaches the consumer battery circuit. The consumers 14 and 16 can be connected as needed to the appropriate battery via switches 17 and 18. The triggering of these switches is performed for instance by a control unit, such as an on-board electrical system control unit 19.

Between the first battery circuit 10 and the second battery circuit 11 is a direct-voltage converter 20, which for instance operates under the conditions current I=const and voltage U=Usoll. The triggering of the DC/DC voltage converter 20 is performed by the on-board electrical system control unit 19, or a microprocessor 21 of the on-board electrical system control unit 19 that also evaluates the SOCS/SOHS algorithms. The exact kind of procedure will be explained later herein.

The microprocessor 21 specifies the measurement variables UMB1 and UMB2 to the voltage converter 20; they correspond to the measured voltage at the battery 13 and the battery 15, respectively. Via an interface 22, the microprocessor 21 is connected to a signalling unit 23. The signalling unit 23 displays the SOCS/SOHS information. The connection between the interface 22 and the signalling stage 23 is done in either analog or digital fashion, for instance via a CAN bus. Both the voltage converter 20 and the microprocessor 21 as well as the interface 22 are components of the control unit 19, in this exemplary embodiment. The DC/DC converter can, however, also be installed separately from the on-board electrical system control unit.

FIG. 2 shows a further two-battery on-board electrical system with a direct-voltage converter (DC/DC converter). This two-battery on-board electrical system in turn includes a first battery circuit 24, which represents the consumer circuit, and at least one generator 25, a battery 26, such as a 12-Volt battery, and electrical consumers 27, which can be connected to the generator 25 and the battery 26 as applicable via a switch means 28 via terminal Kl.30.

The second battery circuit 29 includes at least one battery 30, such as a 12-Volt battery, which is meant to have a high charge state, as well as high-current consumers 31, for instance electrically heatable catalytic converters or starters. Optionally, the high-current consumer 31 can be a starter-generator instead. The high-current consumer 31 can be connected to the battery 30 via a power switch 32, designed as a semiconductor switch or a relay. The triggering of the power switch and of the switch 28 is performed by the control unit 33, which is disposed between the first battery circuit 24 and the second battery circuit 29.

In this exemplary embodiment of FIG. 2, the control unit 33 includes both a DC/DC converter 34 and a line 35, which for the reinforcing supply can be connected to the battery 30 or the power switch 32 as applicable via a switch 36. Depending on the position of the switch 36, the connection between the two battery circuits is made via the reinforcing supply 35 or the DC/DC converter 34. The direction of the resultant current is indicated by arrows.

The control electronics 37, which are a component of the control unit 33 and include at least one microcomputer, a CAN interface, and means for evaluating a voltage sensor system, takes on the task of the required calculations and SOCS/SOHS signalling and triggering operations. Via an analog interface 38a or a digital interface 38b, such as a CAN interface, SOCS/SOHS information is output and exchanged, or the function sequence is varied for instance by means of a further control unit 40. The control unit 40 can for instance be the engine control unit.

The invention, suitably adapted, can also be used in general for multi-battery on-board electrical systems, or on-board electrical systems with a plurality of charging storage means and energy-storing means. As the charging storage means, batteries, capacitors, supercaps, and so forth can be considered.

DETAILED DESCRIPTION OF THE PREFERRED EMBODIMENTS

For the more-detailed description that now follows of the two-battery on-board electrical systems shown in both exemplary embodiments, the following definitions and abbreviations are needed:

EHB: electrohydraulic brake

E-CAT: electric (electrically heatable) catalytic converter system

KSG: special transmission

SOC: state of charge of a battery

SOH: aging status/failure of a battery (state of health)

SOCS (state of charge of systems): threshold value statements on the availability of electrical energy in (sub)systems with a battery. The SOCS threshold values are calibrated to the charge state of the battery 15, 30 in the second battery circuit 11, 29. The typical charge state for signalling SOCS threshold values is SOC=60% . . . 75%. With the algorithms employed, an accuracy on the order of magnitude of 5 to 10% can be achieved.

SOHS (state of health of systems): threshold value statement on irreversible system defects which cause a permanent reduction in the availability of electrical energy to the point of the later possible failure of the electrical energy supply in (sub)systems with a battery. A subdivision is made into defects in the first (SOHS1) and second (SOHS2) battery circuits. Defect states corresponding to SOHS1 are generally characterized by the need for frequent reinforcing supply for the first battery circuit 10, 24 by means of the battery 15, 30 in the second battery circuit 11, 29. Defect states corresponding to SOHS2 characterize a reduction in the availability of electrical energy to the point of the later possible failure of the electrical energy supply in the second battery circuit 11, 29.

The association of the SOCS/SOHS algorithms is made in accordance with the modes of operation a through d already explained. Thus in the various modes of operation, the following algorithms are taken into account:

a) If after a successfully concluded charging event, in other words when a high charge state of the battery 15, 30 in the second battery circuit 11, 29 is expected in the decoupled mode of operation, the voltage in the second battery circuit 11, 29 undershoots a defined voltage threshold value during operation of the motor vehicle with the engine and generator running, then SOCS signalling and an SOHS2 signalling are performed. If there is adequate availability of electrical energy in the first battery circuit 10, 24, then in general, by recharging of the battery in the second battery circuit 11, 29 ("maintenance charging"), an attempt is then made to compensate for this system state.

If jump start detection is done by means of special algorithms, then if a jump start is detected and the engine is running an SOCS signalling is performed, since an undefined charge withdrawal/charge delivery has taken place in the second battery circuit 11, 29. The state "engine running" is assessed here as a criterion for an available minimum energy quantity in the second battery circuit 11, 29.

b) If upon initialization of the control unit 19, 33, for instance after the motor vehicle has been at a stop for a long time, a defined voltage threshold value in the second battery circuit 11, 29 is undershot in the prestarting phase of the engine, then SOCS signalling takes place. By counting and evaluating failed starting events involving a correspondingly defined energy withdrawal from the battery 15, 30 in the second battery circuit 11, 29, SOCS signalling again takes place; that is, the number of unsuccessful starting attempts here is greater than a predeterminable threshold value.

c) In constant-current regulation in the DC/DC converter 20, 34, if a predeterminable defined length of time or a chronological threshold value is exceeded, both an SOCS and SOHS2 signalling are done. Instead of constant-current regulation, constant-power regulation can be performed, suitably adapted.

d) In a reinforcing supply to the first battery circuit 10, 24 by the second battery 15, 30, SOCS signalling is done both in the prestarting phase of the engine and when the engine is running.

If a certain frequency of the reinforcing supply, which frequency is either defined by an absolute value or defined with respect to a certain length of time, is exceeded then SOHS1 signalling takes place. A frequent occurrence of the reinforcing supply is an unambiguous sign of a malfunction in the first battery circuit 10, 24, for instance if the battery 13, 26 is old or defective, or an interrupted connection with the battery, or if the power output from the generator 12, 25 is defectively low, and in the case of short circuits in the consumers or in the wiring.

During the brief supply to high-current consumers 16, 31, no monitoring of the second battery circuit 11, 29 takes place.

The SOCS signalling is done temporarily; that is, it is reset after a high charge state of the second battery 15, 30 is resumed, which is typically after the transition from constant-current regulation to voltage regulation in the direct-voltage converter mode, or upon the termination of a so-called terminal Kl.15 cycle, or in other words after the end of a predeterminable charging cycle.

The SOHS signalling, which pertains to both the SOHS1 and the SOHS2 signalling, is done permanently after the first occurrence, or in other words even beyond a terminal 15 cycle, until a prescribed reset takes place, for instance in the context of eliminating the tripping cause of the defect in a repair facility.

The invention claimed is:

1. A device for determining the availability of electrical energy in an on-board electrical system having energy-storing circuits that form at least two subsystems, in the form of battery circuits, which communicate with one another via a voltage converter, and having a control unit, which influences the voltage converter and includes computation means, which evaluate charge-specific algorithms, wherein the charge-specific algorithms include at least one threshold value statement (SOCS) for the availability of electrical energy in at least one subsystem, threshold value statements (SOHS) for malfunctions in at least one subsystem, and both at least one threshold value statement (SOCS) for availability of electrical energy in at least one subsystem and threshold value statements (SOHS) for malfunctions in at least one subsystem, further comprising means for displaying the availability of the electrical energy, a malfunction, or displaying both the availability of electrical energy and a malfunction.

2. The device of claim 1, wherein the threshold value statements for malfunctions in at least one subsystem (SOHS) are subdivided into threshold value statements (SOHS1) for malfunctions in the first battery circuit (10, 24) and threshold value statements (SOHS2) for malfunctions in the second battery circuit (11, 29).

3. The device of claim 1, wherein the voltage converter (20, 34) is a DC/DC converter, which is a component of the control unit (19, 35) and is triggered by the control unit in such a way that predeterminable criteria are met.

4. The device of claim 1, wherein the control unit (19, 35) includes one additional connection by way of which, when the voltage converter (34) is switched off, a connection can be made between the two battery circuits.

5. The device of claim 1, wherein the battery (13, 26) of the first battery circuit (10, 24) is optimized for cycle capacity, and the battery (15, 30) of the second battery circuit (11,29) is optimized for high-current capacity and/or minimal self-discharge.

6. The device of claim 1, wherein the control unit includes at least computation and memory means, counting means, analog and/or digital interfaces, means for jump start detection, and a voltage sensor system.

7. A method for determining the availability of electrical energy in an on-board electrical system having energy-storing circuits forming at least two subsystems, in the form of battery circuits, which communicate with one another via a voltage converter, and having a control unit, which influences the voltage converter and includes computation means, which evaluate charge-specific algorithms, wherein the charge-specific algorithms include at least one threshold value statement (SOCS) for the availability of electrical energy in at least one subsystem, threshold value statements (SOHS) for malfunctions in at least one subsystem, and Of both at least one threshold value statement (SOCS) for availability of electrical energy in at least one subsystem and threshold value statements (SOHS) for malfunctions in at least one subsystem, further comprising means for displaying the availability of the electrical energy, a malfunction, or displaying both the availability of electrical energy and a malfunction, wherein charge-specific algorithms with at least one threshold value statement for the availability of electrical energy in at least one subsystem (SOCS) and/or algorithms with threshold value statements for malfunctions in at least one subsystem (SOHS, SOHS1, SOHS2) are evaluated.

8. The method of claim 7, wherein different modes of operation for the battery circuits (10, 11, 24, 29) are defined, and that the association of the algorithms is made as a function of the mode of operation detected.

9. The method of claim 7, wherein modes of operation for the first battery circuit are selected, and these modes of operation are defined as follows:
  a) constant-current or constant-power regulation in the voltage converter;
  b) voltage regulation in the voltage converter.

10. The method of claim 7, wherein the modes of operation for the second energy-storing means or battery circuit are selected, and these modes of operation are defined as follows:
  a) battery in the state of repose during operation of the motor vehicle with the engine and generator running;
  b) battery in the state of repose while the motor vehicle is stopped and in the prestarting phase with the engine and generator both at a stop;
  c) charging of the battery in the second battery circuit by means of the direct-voltage converter, with the goal of maintaining the high charge state;
  d) electrical supply of consumers, in particular high-current consumers, from the second battery and/or reinforcing supply to the first battery circuit.

11. The method of claim 10, wherein in the mode of operation a), once the charging operation has been successfully concluded, an (SOCS) and an (SOHS2) detection and signalling are effected, if the voltage in the second battery circuit undershoots a defined voltage threshold value.

12. The method of claim 10, wherein in the mode of operation a), once the charging operation has been successfully concluded, jump start detection is additionally performed by the execution of special algorithms, and an (SOCS) detection and signalling are effected if an jump start is detected, and the state "engine running" is assessed as a criterion for an available minimum amount of energy in the second battery circuit (11, 29).

13. The method of claim 10, wherein in the mode of operation b), upon the initialization of the control unit (19, 33), the question is asked whether after the motor vehicle has been stopped for a long time, in the prestarting phase of the engine a defined voltage threshold value is undershot in the second battery circuit (11, 29), and if so, an SOCS signalling is effected.

14. The method of claim 13, wherein for the SOCS signalling, counting and evaluation of failed starting events is performed, with suitably defined energy withdrawal from the battery (15, 30) in the second battery circuit (11 29), and the SOCS signalling is effected if the number of failed starting attempts is greater than a predeterminable threshold value.

15. The method of claim 7, wherein in the mode of operation c), with constant-current or constant-power regulation in the DC/DC converter (20, 34), an SOCS and an SOHS2 signalling are effected, if exceeding of a predeterminable defined length of time or a chronological threshold value is detected.

16. The method of claim 7, wherein in the mode of operation d), an SOCS signalling is effected if a reinforcing supply to the first battery circuit (10, 24) by the second battery (15, 30) in the prestarting phase of the engine and with the engine running is detected.

17. The method of claim 16, wherein an SOHS1 signalling is effected if exceeding of a certain frequency of the reinforcing supply which is either defined by an absolute value or is referred to a certain time length, is detected.

18. The method of claim 7, wherein the SOCS signalling is effected temporarily and is reset after the reattainment of a charge state of the second battery (15, 30), in particular from the time of the transition from constant-current or constant-power regulation to voltage regulation in operation of the direct-voltage converter or upon termination of a terminal Kl.15 cycle.

19. The method of claim 7, wherein both the SOHS1 and the SOHS2 signalling, after the first occurrence, are effected permanently, even beyond a terminal Kl.15 cycle, until a prescribed reset is effected, in particular in the course of correcting the inciting cause of the defect in a repair facility.

* * * * *